United States Patent [19]

Pantaleo et al.

[11] Patent Number: 4,738,888

[45] Date of Patent: Apr. 19, 1988

[54] SERVING MAT

[76] Inventors: Terese A. Pantaleo, 7854 Redondo La., Orland Park, Ill. 60462; Donald E. Perrin, 255 N. 6th St., Clinton, Iowa 52732

[21] Appl. No.: 33,534

[22] Filed: Apr. 3, 1987

[51] Int. Cl.⁴ .................................................. B32B 3/20
[52] U.S. Cl. .................................... 428/166; 273/1 L; 428/321.5; 446/267
[58] Field of Search ............ 215/100.5; D6/613, 614; D7/45; 273/1 L; 428/13, 166, 321.5; 446/156, 159, 267

[56] References Cited

U.S. PATENT DOCUMENTS

| | | | |
|---|---|---|---|
| D. 175,890 | 7/1955 | Newmark | 446/267 X |
| 2,703,087 | 3/1955 | Newmark | 446/267 X |
| 2,738,616 | 3/1956 | Windle | 446/267 |
| 3,377,738 | 4/1968 | Goodrum, Jr. | 446/267 |
| 3,898,781 | 8/1975 | Facchini | 428/13 X |
| 3,983,277 | 9/1976 | Ackerman et al. | 428/13 X |
| 4,359,224 | 11/1982 | Nottingham et al. | 273/1 L X |
| 4,362,299 | 12/1982 | Suzuki | 273/1 L |
| 4,608,323 | 8/1986 | Zaborney | 429/167 |
| 4,631,210 | 12/1986 | McGee et al. | 428/13 |

*Primary Examiner*—Henry F. Epstein
*Attorney, Agent, or Firm*—Robert E. Wagner; Ralph R. Rath

[57] ABSTRACT

A serving mat includes a pair of superimposed sheets sealed to each other to define a chamber having a free-flowing liquid medium therein with a plurality of discrete articles suspended in said liquid medium and movable by manipulation of the liquid medium in the chamber.

3 Claims, 1 Drawing Sheet

U.S. Patent Apr. 19, 1988 4,738,888
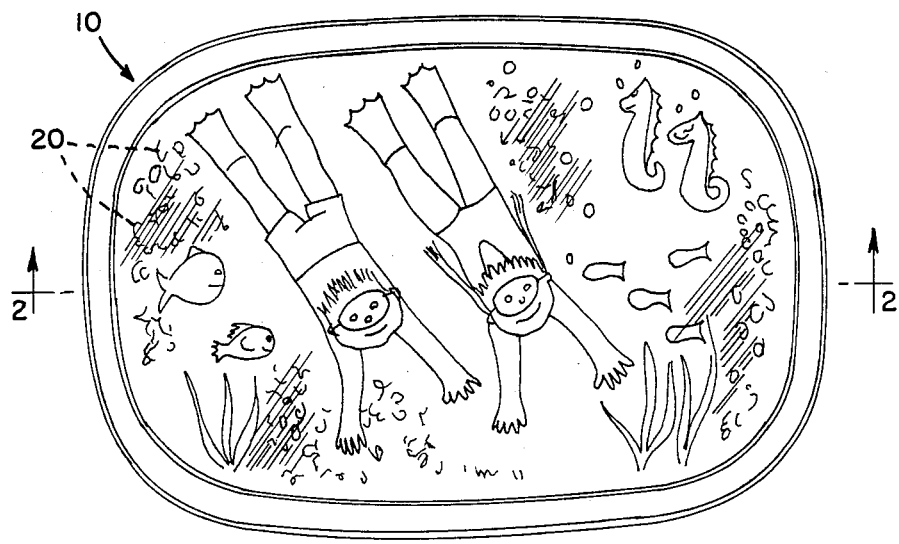
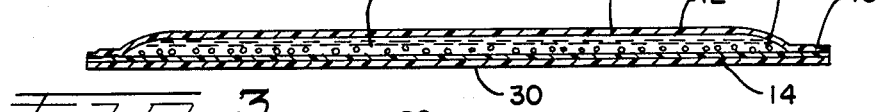
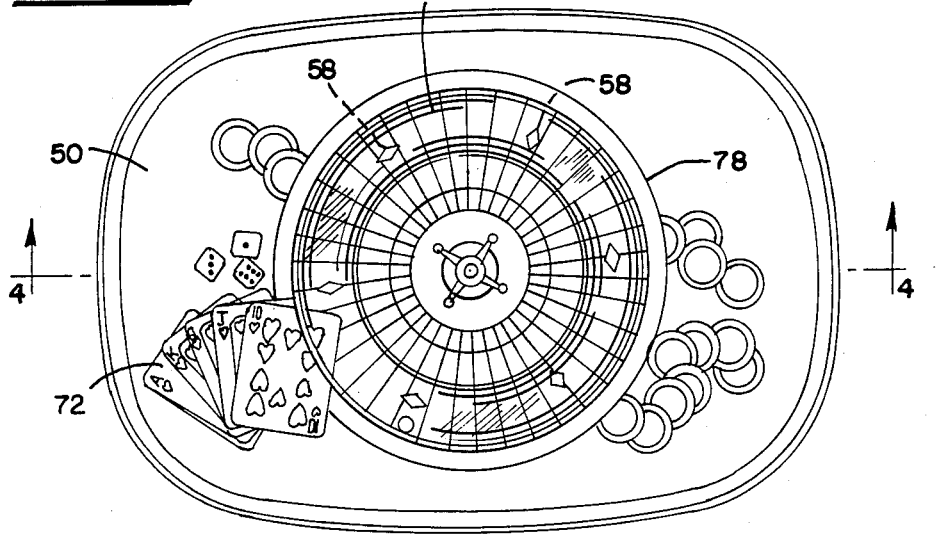

SERVING MAT

DESCRIPTION

1. Technical Field

The present invention relates generally to an article of manufacture and, more particularly, to a protective serving mat which also acts as an amusement device.

2. Background Prior Art

Protective serving mats, such as placemats and coasters, are used extensively for serving food and beverage products in various public facilities as well as in residential kitchens. Usually, restaurants that cater to children will provide some type of amusement for the customers and many times these amusement devices are embodied into the placemats that are used for serving the food. For example, various restaurants have disposable placemats that embody various types of games to keep children occupied before, during and after meals.

As is apparent, manufacturers of such products are constantly striving to obtain a better product that will provide a competitive advantage at a reasonable price without sacrificing functionality of the unit.

SUMMARY OF THE INVENTION

According to the present invention, a protective mat has been developed that is reusable and embodies movable objects therein which can be utilized for amusement during idle times in a restaurant or at a kitchen table. More specifically, the device consists of a protective mat that includes upper and lower pliable and heat-sealable plastic sheets, with at least the upper plastic sheet being transparent. The two sheets are sonically-sealed to each other to define a sealed chamber therein. A freely-flowing liquid medium, preferably of a colored variety, is trapped within the chamber and a plurality of discrete articles are suspended in the fluid medium to be movable within the chamber by manipulation of the liquid medium through contact with the plastic sheets. In one embodiment of the invention, the protective mat is configured to be used as a serving mat, such as a placemat or a coaster, for serving food and beverages.

In the illustrated embodiment, the device or mat consists of a generally rectangular pair of sheets that are sonically-sealed to each other throughout the major area and define an annular chamber that is located generally in the center of the placemat. The annular chamber thus defines a annular channel that has the liquid trapped therein which is freely flowing and has a plurality of discrete articles that are preferably buoyant to be suspended within the liquid medium.

The upper or transparent sheet preferably has suitable indicia thereon which defines the parameters of a game and the discrete articles that are suspended in the liquid medium define "players" for the game so that manipulation of the liquid medium will move the players along the channel and will come to rest at random locations for participation in the game.

For example, the indicia could define the outline of a roulette wheel with the numerical indicia adjacent to or overlying the annular channel so that the discrete objects or "players" can be manipulated and come to rest in one of the squares defining the parameters of the game. in one of the squares defining the parameters of the game.

In another embodiment, the protective mat could be in the form of a circular coaster having an annular chamber around the periphery thereof with the discrete articles defining floating objects within the liquid medium that could be manipulated by contact with the sheets.

In each embodiment, the protective mat preferably includes an additional layer of friction-providing material, such as a rubber layer, to prevent sliding of the mat on its supporting surface.

BRIEF DESCRIPTION OF SEVERAL VIEWS OF DRAWINGS

FIG. 1 is a plan view of a placemat having the features of the present invention incorporated therein;

FIG. 2 is a cross-sectional view as viewed along line 2—2 of FIG. 1;

FIG. 3 is a view similar to FIG. 1 showing a slightly modified form of placemat; and, FIG. 4 is a cross-sectional view as viewed along line 4—4 of FIG. 1.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 of the drawings discloses a serving mat, such as a placemat, generally designated by reference numeral 10. The placemat 10 is generally rectangular in plan view and consists of upper and lower sheets 12 and 14 that are suitable interconnected to each other around the periphery thereof to define a unitary structure. Preferably, the upper and lower sheets 12 and 14 are formed from a heat-sealable plastic material, such as polypropylene, and at least the upper sheet is preferably transparent, for a purpose to be described later.

In the embodiment illustrated in FIG. 1, the upper and lower sheets 12 and 14 are heat-sealed to each other around the periphery 15 to define a sealed chamber 16 therebetween which encompasses a substantial portion of the exposed surface of the placemat 10. A liquid medium, such as colored water, is trapped within the sealed chamber 16, and is free flowing therein so as to be movable within the chamber by manipulation of the entire placemat, or at least contact with the upper sheet.

The liquid medium 18 has a plurality of discrete articles 20 suspended therein and the articles are preferably lightweight objects (such as particles of a metal foil or the like), which will easily remain suspended within the liquid medium between the upper and lower sheets. The upper sheet, which as indicated above is transparent, preferably has any type of suitable indicia thereon. In the embodiment illustrated in FIG. 1, this indicia is in the form of a diver and various types of water mammals.

While not necessary to the practice of the invention, the placemat shown in FIG. 1 preferably has an additional lower layer 30 of a non-slip material, such as rubber, adhered to the lower sheet to provide a friction-gripping surface that is in contact with the supporting surface, such as table, for the placemat.

It is apparent that the colored water and the colored discrete articles are readily visible through the transparent sheet and the liquid medium can easily be manipulated by pressing on the upper sheet to move the water and the various discrete articles into different areas of the chamber so as to simulate a moving body of water.

A slightly modified form of the invention is shown in FIGS. 3 and 4 and again includes upper and lower sheets of flexible material that are heat-sealable to each other. The upper sheet 50 is preferably transparent and the major portion of the upper and lower sheets 50 and 52 are heat-sealed to each other to define a small annular chamber 54 having a liquid medium 56 therein. The liquid medium, such as colored water, has a plurality of discrete articles or objects 58 that are suspended therein and are movable by manipulation of the liquid within an annular channel defined by the chamber.

In the embodiment shown in FIG. 3, the transparent surface has indicia imprinted thereon which defines the parameters of the game. In the specific embodiment shown, the game is shown as a roulette wheel in which various squares 60 are superimposed over the annular chamber and the discrete articles or objects 38 are positioned by manipulation of the liquid medium to any of the squares that form part of the game. Again, the objects can easily be manipulated pressing on the upper surface of the upper sheet 50 to move the liquid medium along the annular channel. Thus, the liquid medium provides the driving force for the articles or objects 58. Also, an anti-skid sheet or member 70 may be attached to the exposed surface of lower sheet 52. Any other type of indicia, such as shown at 72 in FIG. 4, may be added as desired.

Of course, various modifications come to mind without departing from the spirit of the invention. For example, the placemat shown in FIG. 3 could easily be converted to a coaster for a glass or other circular serving element. More specifically, the upper and lower sheets 50, 52 and the member 70 could be removed outside line 78 to form the coaster and the following claims are intended to cover such modification.

While specific embodiments have been illustrated and described, numerous modifications come to mind without significantly departing from the spirit of the invention and the scope of protection is only limited by the scope of the accompanying claims.

We claim:

1. An article of manufacture comprising a pair of superimposed pliable sheets interconnected along at least peripheral edges and intermediate said edges to define an annular chamber therebetween with a support member secured to one sheet to prevent sliding on a support surface, said chamber having a liquid medium therein in a mobile state and free to move therein, said liquid medium having at least one discrete article suspended therein manipulatable by causing displacement of said liquid medium to move said discrete articles in said chamber.

2. An article of manufacture as defined in claim 1, in which said annular chamber is circular.

3. A placemat comprising a pair of superimposed pliable plastic sheets having heat-sealed peripheral edges and being heat sealed between said edges to define an elongated channel having a liquid medium therein, at least one movable object in said channel with said liquid medium providing the driving force for said movable object when said liquid medium is displaced by contact with one of said sheets.

* * * * *